United States Patent
Cha et al.

(10) Patent No.: US 10,284,909 B2
(45) Date of Patent: May 7, 2019

(54) DISPLAY APPARATUS, USER TERMINAL APPARATUS, SYSTEM, AND CONTROLLING METHOD THEREOF

(71) Applicant: SAMSUNG ELECTRONICS CO., LTD., Suwon-si (KR)

(72) Inventors: Hyun-sik Cha, Yongin-si (KR); Seung-jun Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/425,050

(22) Filed: Feb. 6, 2017

(65) Prior Publication Data
US 2017/0230710 A1     Aug. 10, 2017

(30) Foreign Application Priority Data

Feb. 4, 2016  (KR) .................. 10-2016-0013887

(51) Int. Cl.
*H04N 7/16*     (2011.01)
*H04N 21/443*   (2011.01)
(Continued)

(52) U.S. Cl.
CPC .......... *H04N 21/4436* (2013.01); *G06F 3/14* (2013.01); *G09G 3/2096* (2013.01);
(Continued)

(58) Field of Classification Search
CPC .......... H04N 21/4436; H04N 21/4432; H04N 21/4263
(Continued)

(56) References Cited

U.S. PATENT DOCUMENTS 3,811,090 A  *  5/1974  Uchida .................. H04N 5/63
                                                 348/730
4,331,977 A  *  5/1982  Cohn .................... H04N 5/63
                                                 348/725
(Continued)

FOREIGN PATENT DOCUMENTS

EP     2 226 721 A1    9/2010
EP     2 755 398 A1    7/2014
(Continued)

OTHER PUBLICATIONS

Search Report dated May 15, 2017 issued by the International Searching Authority in counterpart International Application PCT/KR2017/001263 (PCT/ISA/210).
(Continued)

*Primary Examiner* — Michael B. Pierorazio
(74) *Attorney, Agent, or Firm* — Sughrue Mion, PLLC

(57) ABSTRACT

A display apparatus is disclosed. The display apparatus includes a communicator configured to communicate with an access point (AP), a storage, a display, an image processor, and a processor configured to, in a sleep mode, in response to a first signal being received via the AP from an external device accessing the AP, switch from the sleep mode to an standby mode and transmit a response signal with respect to the first signal to the external device, and to store content received from the external device in the storage while the display is turned-off, wherein the processor, in response to a second signal further being received from the external device, activates the image processor to process the content stored in the storage and activates the display to display the processed content.

20 Claims, 13 Drawing Sheets

(51) Int. Cl.
*G06F 3/14* (2006.01)
*G09G 3/20* (2006.01)
*H04N 21/426* (2011.01)
*H04N 21/433* (2011.01)
*H04N 21/4363* (2011.01)
*H04N 21/43* (2011.01)
*H04N 21/41* (2011.01)
*H04N 21/436* (2011.01)
*H04N 21/485* (2011.01)

(52) U.S. Cl.
CPC ..... *H04N 21/4126* (2013.01); *H04N 21/4263* (2013.01); *H04N 21/4307* (2013.01); *H04N 21/4331* (2013.01); *H04N 21/43637* (2013.01); *H04N 21/4432* (2013.01); *G09G 2330/022* (2013.01); *G09G 2330/026* (2013.01); *G09G 2354/00* (2013.01); *G09G 2370/025* (2013.01); *G09G 2370/16* (2013.01); *H04N 21/43615* (2013.01); *H04N 21/485* (2013.01)

(58) Field of Classification Search
USPC .......................................................... 725/151
See application file for complete search history.

(56) References Cited

U.S. PATENT DOCUMENTS

| | | | | |
|---|---|---|---|---|
| 4,439,784 A * | 3/1984 | Furukawa | ......... | H04N 7/17363 340/4.37 |
| 5,475,364 A * | 12/1995 | Kenet | ............... | G08B 13/19 340/522 |
| 6,002,380 A * | 12/1999 | Lee | .................. | G09G 1/04 315/371 |
| 6,076,169 A * | 6/2000 | Lee | .................. | G06F 1/3215 713/320 |
| 6,205,318 B1 * | 3/2001 | Schindler | ............ | H04N 5/4401 345/212 |
| 6,259,486 B1 * | 7/2001 | Mahvi | ................. | H04N 5/44 348/553 |
| 7,411,631 B1 * | 8/2008 | Joshi | .................. | H04N 5/63 348/730 |
| 7,730,507 B2 * | 6/2010 | Sakai | ................. | H04N 5/4401 348/730 |
| 8,412,798 B1 | 4/2013 | Wang | | |
| 2005/0132420 A1 * | 6/2005 | Howard | ............... | G06F 3/017 725/135 |
| 2005/0243081 A1 * | 11/2005 | Cha | ................... | H02M 1/15 345/212 |
| 2006/0140452 A1 * | 6/2006 | Raynor | ............... | G06F 1/3203 382/115 |
| 2007/0124775 A1 * | 5/2007 | DaCosta | ............ | H04N 7/17318 725/62 |
| 2007/0139569 A1 | 6/2007 | Matsubayashi | | |
| 2007/0152994 A1 * | 7/2007 | Koh | ................... | H04N 5/63 345/211 |
| 2008/0066111 A1 * | 3/2008 | Ellis | .................. | H04N 5/44543 725/57 |
| 2009/0010671 A1 * | 1/2009 | Hashimoto | ......... | G03G 15/5004 399/88 |
| 2009/0021649 A1 * | 1/2009 | Lee | ................... | H04N 5/63 348/730 |
| 2009/0172443 A1 | 7/2009 | Rothman et al. | | |
| 2009/0316796 A1 * | 12/2009 | Taleb | ................. | H04N 21/4424 375/240.25 |
| 2010/0196038 A1 * | 8/2010 | Yamaguchi | ........ | G03G 15/2039 399/69 |
| 2010/0306558 A1 * | 12/2010 | Kang | ................. | G06F 1/26 713/300 |
| 2010/0321569 A1 | 12/2010 | Kim | | |
| 2011/0179300 A1 * | 7/2011 | Suzuki | ............... | G11B 17/056 713/323 |
| 2012/0282914 A1 | 11/2012 | Alexander | | |
| 2013/0054954 A1 | 2/2013 | Lee | | |
| 2014/0181857 A1 | 6/2014 | Lee et al. | | |
| 2014/0210754 A1 * | 7/2014 | Ryu | ................... | G06F 3/017 345/173 |
| 2014/0245041 A1 * | 8/2014 | Ayalur | ................ | G06F 1/3206 713/323 |
| 2014/0347565 A1 | 11/2014 | Fullam et al. | | |
| 2014/0364056 A1 | 12/2014 | Belk et al. | | |
| 2015/0026491 A1 | 1/2015 | Park et al. | | |

FOREIGN PATENT DOCUMENTS

| | | |
|---|---|---|
| KR | 1020110096831 A | 8/2011 |
| KR | 101537786 B1 | 7/2015 |
| KR | 1020150075142 A | 7/2015 |

OTHER PUBLICATIONS

Written Opinion dated May 15, 2017 issued by the International Searching Authority in counterpart International Application PCT/KR2017/001263 (PCT/ISA/237).

Communication dated Aug. 8, 2018, issued by the European Patent Office in counterpart European Application No. 17747819.5.

* cited by examiner

DISPLAY APPARATUS, USER TERMINAL APPARATUS, SYSTEM, AND CONTROLLING METHOD THEREOF

CROSS-REFERENCE TO RELATED APPLICATIONS

This application claims priority from Korean Patent Application No. 10-2016-0013887, filed on Feb. 4, 2016 in the Korean Intellectual Property Office, the disclosure of which is incorporated herein by reference in its entirety.

BACKGROUND

1. Field

Apparatuses and methods consistent with the present disclosure relate to a display apparatus, a user terminal apparatus, a system, and a controlling method thereof, and more particularly, to a display apparatus for displaying content stored in a user terminal apparatus, a user terminal apparatus, a system, and a controlling method thereof.

2. Description of the Related Art

Technological advances in electronics have brought us various types of personal electronic devices that enrich our lives. In particular, various display apparatuses such as a television (TV), a cellular phone, a personal computer (PC), a notebook PC, and personal digital assistants (PDA) have been widely adopted in most homes for accessing information and audio/video content.

As the popularity of these devices increases, users expect these various devices to work with each other more seamlessly. In particular, along with the development of enhanced image processing for display devices, various attempts have been made with regard to image quality processing.

A conventional television, for example, does not offer much interactivity with a user, and thus the possibility of transferring content to and from these devices is limited.

For example, a user may execute a multimedia application related to playing back video or audio files stored in a smartphone, and then select a menu for sharing the media content with another device such as a smart television. However, such a method may involve excessive buffering or other inconveniences for the user.

In addition, a conventional method requires much interaction and manipulation by a user, which can be cumbersome and inconvenient for the user.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a display apparatus for automatically transmitting content stored in a user terminal apparatus and displaying content, a user terminal apparatus, a system, and a controlling method thereof.

According to an aspect of an exemplary embodiment, a display apparatus may include a communicator configured to communicate with an access point (AP), a storage, a display, an image processor and a processor configured to, in a sleep mode, in response to a first signal being received via the AP from an external device accessing the AP, switch from the sleep mode to an standby mode and transmit a response signal with respect to the first signal to the external device, and to store content received from the external device in the storage while the display is turned-off, wherein the processor, in response to a second signal further being received from the external device, activates the image processor to process the content stored in the storage and activates the display to display the processed content.

According to an aspect of an exemplary embodiment, a user terminal apparatus for controlling a display apparatus operating in a sleep mode may include a communicator configured to communicate with an access point (AP) to which the display apparatus is connected and a processor configured to transmit a first signal to the display apparatus through the AP when preset content is executed or updated and to perform control to transmit the content to the display apparatus upon receiving a response signal corresponding to the first signal from the display apparatus.

According to an aspect of an exemplary embodiment, a system may include a display apparatus operating in a sleep mode; a user terminal apparatus for controlling the display apparatus. the user terminal apparatus may be configured to transmit a first signal to the display apparatus through the AP when the user terminal apparatus accesses the AP to which the display apparatus is connected and then preset content is executed or updated, transmit the content to the display apparatus upon receiving a response signal corresponding to the first signal from the display apparatus, and transmit a second signal to the display apparatus when a preset event occurs. the display apparatus may be configured to, in response to a first signal being received in a sleep mode, switch from the sleep mode to a standby mode, transmit a response signal with respect to the first signal to the external device, and store the content received from the external apparatus, in response to a second signal further being received from the external device, activate an image processor which processes a received content and a display which displays a processed content upon receiving the second signal.

According to an aspect of an exemplary embodiment, a method of controlling a display apparatus may include, in a sleep mode, in response to a first signal being received via the AP from an external device accessing the AP, switching from the sleep mode to a standby mode and transmitting a response signal with respect to the first signal to the external device; storing content received from the external device; and in response to a second signal further being received from the external device, activating an image processor which processes the received content and activating a display the processed content.

According to an aspect of an exemplary embodiment, a method of controlling a user terminal apparatus for controlling a display apparatus operating in a sleep mode may include communicating with an access point (AP) to which the display apparatus is connected; transmitting a first signal to the display apparatus through the AP when preset content is executed or updated; and performing control to transmit the content to the display apparatus upon receiving a response signal corresponding to the first signal.

According to the diverse exemplary embodiments of the present disclosure, content reproduced by a user terminal apparatus may be easily and rapidly displayed by a display apparatus, thereby improving user convenience.

Additional and/or other aspects and advantages of the invention will be set forth in part in the description which follows.

BRIEF DESCRIPTION OF THE DRAWINGS

The above and/or other aspects of the present disclosure will be more apparent by describing exemplary embodiments of the present disclosure with reference to the accompanying drawings, in which.

DETAILED DESCRIPTION OF THE EXEMPLARY EMBODIMENTS

Certain exemplary embodiments of the present disclosure will now be described in greater detail with reference to the accompanying drawings.

Figure 1:
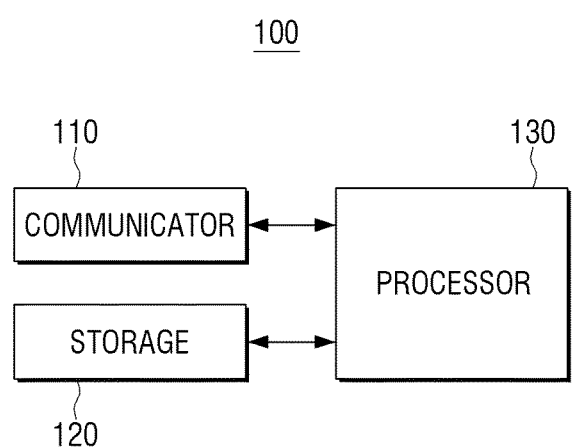
FIG. 1 is a block diagram illustrating a structure of a display apparatus according to an exemplary embodiment.

FIG. 1 is a block diagram illustrating a structure of a display apparatus 100 according to an exemplary embodiment of the present disclosure.

Referring to FIG. 1, the display apparatus 100 may include a communicator 110, a storage 120, and a processor 130.

Here, the display apparatus 100 may be embodied as various types of electronic apparatuses such as a television (TV), an electronic slate, an electronic table, a large format display (LFD), a smartphone, a tablet personal computer (PC), a desk top PC, a notebook PC, a set top box, a smart watch, and a wearable device.

The communicator 110 may communicate with an access point (AP). In detail, the communicator 110 may communicate with the AP via various communication schemes such as Bluetooth (BT), wireless fidelity (Wi-Fi), Zigbee, infrared (IR), serial interface, universal serial bus (USB), and near field communication (NFC).

Here, the access point (AP) refers to a low-output wireless device that functions as a base station in a wireless local area network (LAN) and functions as a bridge between wired communication and wireless communication. In this regard, in terms of a wired network, the AP is embodied in a router, a switch, or the like and, accordingly, may extend a wired network to a wireless network. For example, the AP may be embodied as an Internet protocol (IP) sharer, a wireless network card, and so on, connected to a MODEM.

The communicator 110 may communicate with an AP to communicate with other external devices connected to the AP via the AP.

The storage 120 may store various information items and, to this end, the storage 120 may be embodied as a storage medium such as non-volatile memory (e.g., a flash memory and an electrically erasable ROM (EEROM), and a hard disk.

The processor 130 may recognize an external device based on a first signal that is received from an AP as the external device accesses the AP, receive content information stored in the external device, and store the content information in the storage 120, in a sleep mode.

A state where the display apparatus 100 is in a sleep mode indicates that less power is consumed than a state where the display and the processor 130 perform a normal operation, while power is being supplied to the display apparatus 100, and the communicator 100 operates to communicate with AP. To be specific, the display is turned off, and the processor 130 consumes minimum power to respond to the wake-up signal, and the communicator 110 consumes power to maintain session with AP only.

When an external device is connected to the AP while the display apparatus 100 is in a sleep mode, the external device transmits a first signal to the display apparatus 100 via the AP, and the processor 130 receives the first signal through the communicator in a power-saving mode. The processor may identify which is the external device connected to the AP.

Here, the first signal may be defined as a wake-up signal. That is, the processor 130 may recognize the external device connected to the AP based on the wake-up signal received from the AP. The wake-up signal may be generated from the external device connected to the AP and transmitted to the display apparatus 100 via the AP.

In particular, upon receiving the wake-up signal, the processor 130 may control the display apparatus 100 to operate in a stand-by state. Here, the stand-by state refers to a state in which content information stored in an external device is capable of being received. To be specific, the display is turned off in a stand-by state, the processor 130 operates in a normal state, and the communicator 110 operates in a normal state as well.

The processor 130 may transmit a response signal to an external device in response to the received wake-up signal. The response signal may include a signal requesting to transmit a predetermined content.

In the aforementioned stand-by state, the processor 130 may receive content information stored in an external device connected to the AP and store the content information in the storage 120. Here, the content information received from an external device may be information regarding a content which satisfies predetermined time condition from among a plurality of contents stored in an external device. Here, the predetermined time may be determined by an external device based on time when an external device is connected with AP. To be specific, information on a content which is generated or executed by an external device from the time when an external device accesses AP to before 24 hours can be transmitted to the display apparatus 100.

For example, until the external device accesses the AP, when a photographing application is executed to capture an image and to store the captured image, a music reproducing application is executed to reproduce music, a web browser application is executed to display a web site, and a video image is reproduced in the web site, the content information may include information on a picture, music, a web site, and a video image.

In detail, the information on a picture, music, a web site, and a video image may include an image file corresponding to the captured image, a music related album image or reproducing list, a web site link address, a video image file, a video image link address, or the like.

The processor 130 may receive the aforementioned information on a picture, music, a web site, and a video image from an external device via the AP and store the information in the storage 120, in particular, a buffer. Needless to say, the processor 130 may receive the aforementioned information on a picture, music, a web site, and a video image directly from an external device and, in this case, Bluetooth or a WIFI direct scheme may be used.

Figure 2:
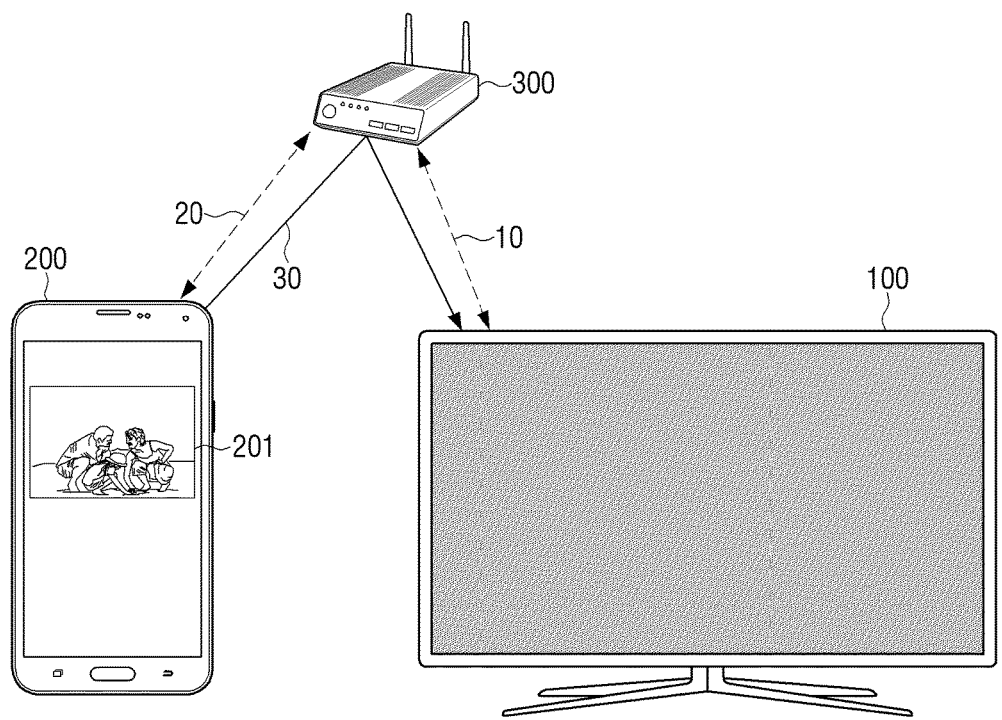
FIG. 2 is a diagram illustrating transmission of a wake-up signal and transmission of content information according to an exemplary embodiment.

FIG. 2 is a diagram for explanation of transmission of a wake-up signal and transmission of content information according to an exemplary embodiment of the present disclosure.

Referring to FIG. 2, while the display apparatus 100 performs communication 10 with the AP 300 and operates in a sleep mode, a user terminal apparatus 200 may perform communication 20 with the AP 300. At this time, the AP 300 may transmit information on the display apparatus 100 connected to the AP 300 to a user terminal apparatus 200. The display apparatus 100 may provide information on a mode of the display apparatus 100 to the AP 300. A user terminal apparatus 200, when information of the display apparatus 100 received from the AP 300 corresponds to pre-registered information of the display apparatus 100, may generate the aforementioned wake-up signal 30 and transmit the signal to the display apparatus 100 via the AP 300. Or, if information on the display apparatus 100 received from the AP is the pre-registered information of the display apparatus 100, and the display apparatus 100 operates in a sleep mode, the user terminal apparatus 200 may transmit the wake-up signal to the display apparatus 100 via the AP 300.

In the meantime, the display apparatus 100, in response to a wake-up signal received from the user terminal apparatus 200, may transmit a response signal (response signal or a content request signal) to the user terminal apparatus 200. In the meantime, the response signal may include a content request signal.

The user terminal apparatus 200, when receiving a response signal from the display apparatus 100, may transmit a content stored in the user terminal apparatus 200 to the display apparatus 100. In addition, the display apparatus 100 may store a content received from the user terminal apparatus 200 in the storage 120.

When the user terminal apparatus 200 is connected to the AP 300 while displaying an image 201 on a display, the user terminal apparatus 200 may transmit information related to the displayed image 201 to the display apparatus 100 via the AP 300. Needless to say, the user terminal apparatus 200 may transmit information related to the image 201 to the display apparatus 100 via the AP 300 or transmit the information directly to the display apparatus 100 using Bluetooth or a WIFI direct scheme.

In the meantime, after the display apparatus 100 is switched from the sleep mode to stand-by mode in response to the wake-up signal 30 and there is no user input through the inputter within the preset time, the apparatus can be re-switched to the sleep mode. In addition, after the display apparatus 100 is switched to the stand-by mode, when the second, third signals are not received from the user terminal apparatus 200 or the AP 300, the apparatus can be re-switched to the sleep mode. Here, the second signal is a signal corresponding to a command to switch a mode of the display apparatus 100 to a welcome mode, and the third signal may be a signal corresponding to a command to switch a mode of the display apparatus 100 to a TV-on mode.

The display apparatus 100, when receiving the second signal from a stand-by mode, may activate an image processor (not shown) and a display. In addition, the image processor may process a content received from the user terminal apparatus 200 in a stand-by mode, and the display may display a content processed by the image processor. In the meantime, a state where the image processor and the display provided on the display apparatus 100 are activated according to the second signal is defined as a welcome mode.

In the meantime, while the display apparatus 100 is in a sleep mode, when the second signal is received, mode of the display apparatus 100 can be switched to the stand-by to determine whether a content is stored in the storage 120. When a content is stored in the storage 120, the display apparatus 100 may activate the image processor and the display and display a content stored in the storage. In the meantime, if a content is not stored in the storage 120, a mode of the display apparatus 100 can be maintained as the stand-by mode for predetermined time.

While the display apparatus 100 is in a sleep mode, when a third signal is received, a mode of the display apparatus 100 is switched to the TV-on mode directly, without being changed to the stand-by or the welcome mode. In the TV-on, the processor 130, the display, the tuner (not shown), and the communicator 110 are activated, and the display apparatus 100 may display a received broadcast program through the tuner.

In the TV-on mode, the display apparatus 100 may display a screen based on register information which is stored when the apparatus is turned off. For example, while being turned off, if the display apparatus 100 displays number 7 channel, in the TV-on mode, the display apparatus 100 may display the number 7 channel. Or, during turn-off, if the display apparatus 100 displays a content received from HDMI1, in a TV-on mode, the display apparatus 100 may display a content received from HDMI1. Therefore, when a mode of the display apparatus 100 is the TV-on mode, the display apparatus 100 may display a content based on register information stored during turn-off.

FIG. 2 illustrates the case in which the display apparatus 100 displays a black-and-white image in order to indicate a sleep mode in which a power source is currently connected to the display apparatus 100 but a monitor is turned off and only a function of communicating with the AP 300 is activated.

While the processor 130 is in a stand-by mode, when a second signal, that is, a command to enter a welcome mode is received from an external device, only the configurations to reproduce a content stored in the storage are activated. Here, the configurations to reproduce a content stored in the storage may be an image processor or a display provided on the display apparatus 100.

Here, the second signal refers to a control signal that is generated by the external device and is transmitted directly to the display apparatus 100. For example, the second signal may be a control signal that is generated according to user manipulation with respect to the external device or a control signal that is generated based on movement of the external device as a user moves the external device.

Upon receiving the second signal from an external device, the processor 130 may activate only a function related to content reproduction based on content information stored in the storage 120. To be specific, the processor 130 may swift only the image processor (for example, GPU) which performs image processing and display which displays a content from an inactive state to an active state.

An operating state of the display apparatus 100, in which only the function related to content reproduction is activated, will be defined as a welcome mode. The welcome mode refers to a state in which content stored in the storage 120 is simply reproduced, but not a state in which the display apparatus 100 provides a function as a TV for receiving a broadcast program and displaying the broadcast program on a monitor. Here, the content stored in the storage 120 includes a content received from the user terminal apparatus 200.

For example, when the received content information is information on a picture, music, a web site, and a video image, the processor 130 may activate only components (e.g., a display and a speaker) required to reproduce the picture, the web site, and the video image or to perform a function required to reproduce music.

Figure 3:
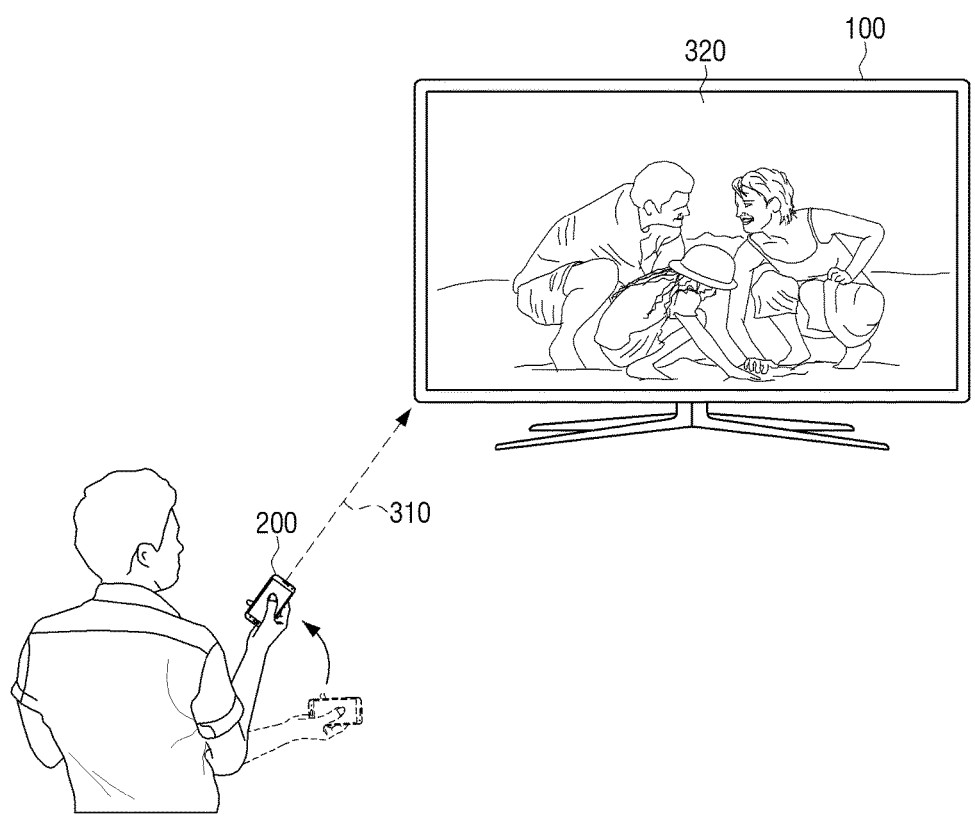
FIGS. 3 and 4 are diagrams illustrating an operation in an welcome mode according to an exemplary embodiment.
Figure 4:
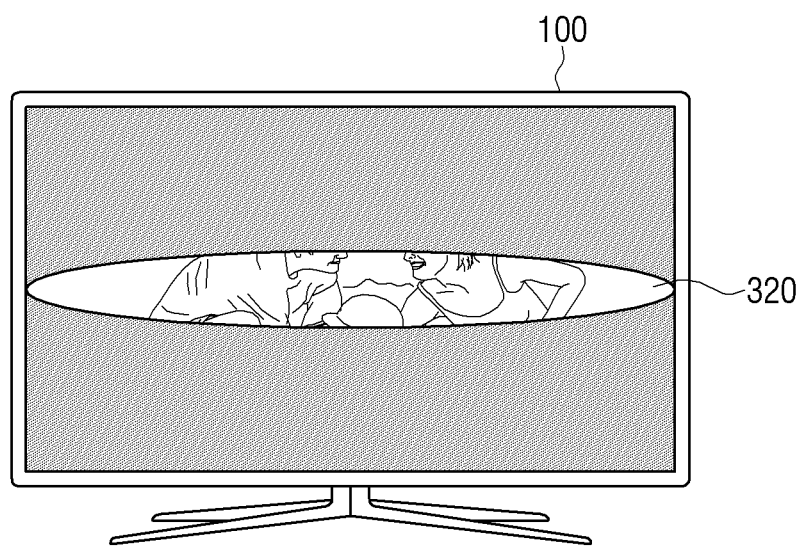

FIGS. 3 and 4 are diagrams for explanation of an operation in an IOT-on mode according to an exemplary embodiment of the present disclosure.

Referring to FIG. 3, when a user lifts the user terminal apparatus 200, a second signal 310 may be generated and transmitted to the display apparatus 100 according to movement of the user terminal apparatus 200 and, in this case, the display apparatus 100 may display an image 320 based on information that is pre-stored in the storage 120 and is being displayed until the user terminal apparatus 200 accesses the AP 300 in FIG. 2 while operating in the welcome mode.

That is, the image 320 displayed by the display apparatus 100 may be the same as the image 201 that is displayed until the user terminal apparatus 200 accesses the AP 300.

Here, the processor 130 may activate only a display required to display the image 320.

Upon receiving the second signal, the processor 130 may reproduce content while providing a preset image feedback indicating operating in a welcome mode. For example, the preset image feedback may include an effect of displaying an image on an entire screen or displaying a plurality of images in the form of a thumbnail or an effect of gradually showing an image from a central portion of a screen as if a screen opens its eye during display of the image.

Referring to FIG. 4, the display apparatus 100 may provide an effect of showing the image 320 from the central portion of the screen during display of the image 320 in welcome mode such that a user feels an effect of showing the image 320 as if a screen opens its eye.

The aforementioned preset image feedback may be set by the display apparatus 100 or the user terminal apparatus 200, which will be described below.

Although FIG. 4 illustrates an exemplary embodiment in which a user transmits the second signal to the display apparatus 100 using the user terminal apparatus 200, the second signal may also be transmitted to the display apparatus 100 through a remote controller as well as the user terminal apparatus 200.

For example, when a user lifts a remote controller and points toward a screen of the display apparatus 100, the remote controller may generate the second signal and transmit the second signal to the display apparatus 100 and, accordingly, the display apparatus 100 may operate in a welcome mode as described above.

As such, whether the second signal is to be received from any device may be set according to user manipulation by the display apparatus 100.

Upon receiving a third signal from an external device, the processor 130 may perform control to operate in a TV-on mode for reproducing a broadcast program.

Here, the TV-on mode refers to a state in which all components of the display apparatus 100 are activated, for example, a state in which all components such as a tuner, an image processor, a sound processor, a scaler, and a sensor included in the display apparatus 100 are activated.

In the TV-on mode, the processor 130 may not perform only a content reproducing function based on content information stored in the storage 120 but may perform all functions of the display apparatus 100, for example, a function of receiving and displaying a broadcast program through the tuner and a function of receiving EPG information and displaying program related information.

Here, the third signal may be a TV-on signal that is generated and received by the user terminal apparatus 200 or a TV-on signal that is generated and received while a TV-on functional key included in a remote controller device is pushed.

Figure 5:
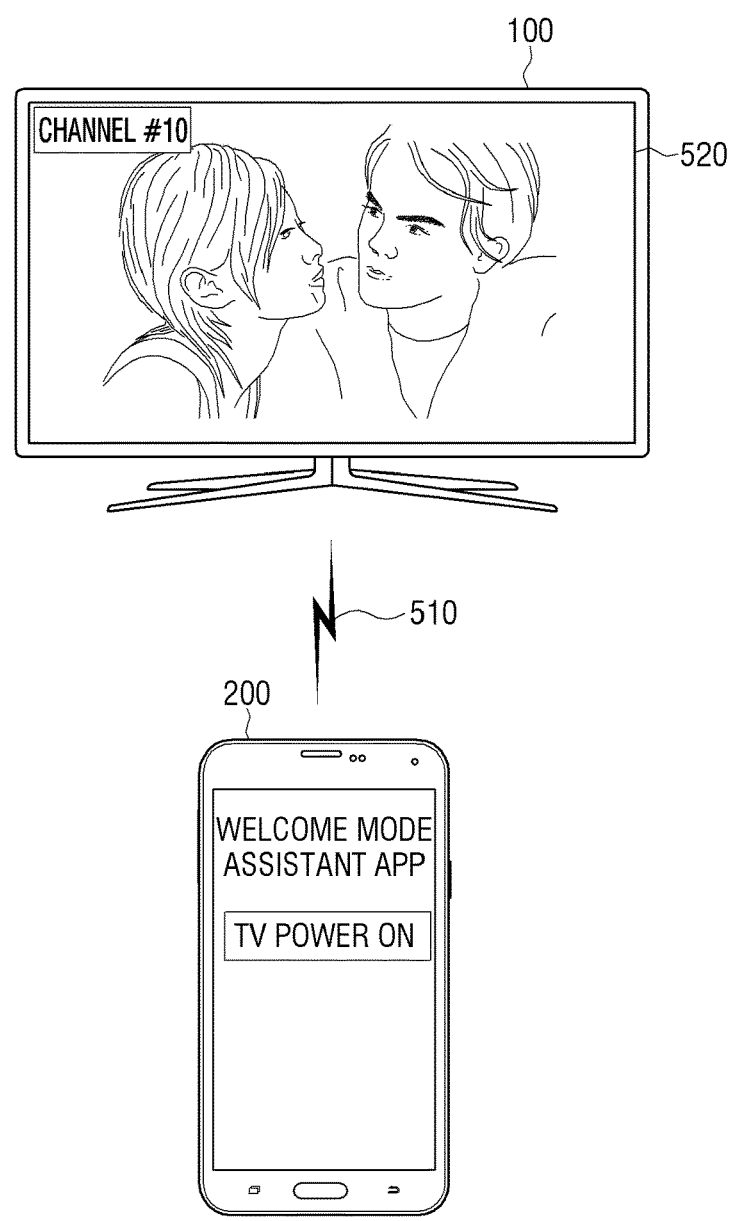
FIG. 5 is a diagram illustrating an operation in a TV mode according to an exemplary embodiment.

FIG. 5 is a diagram for explanation of an operation in a TV-on mode according to an exemplary embodiment of the present disclosure.

Referring to FIG. 5, the user terminal apparatus 200 may generate a third signal 510 and transmit the third signal 510 to the display apparatus 100 and, accordingly, upon receiving the third signal 510, the display apparatus 100 may reproduce a broadcast program 520 corresponding to channel #10 while all components of the display apparatus 100 are activated.

Here, when a user touches an icon corresponding to TV turn-on on a preset application being executed in the user terminal apparatus 200, the user terminal apparatus 200 may generate the third signal 510.

As described above, upon receiving the second signal in a sleep mode, the display apparatus 100 may operate in a welcome mode and, upon receiving the third signal in a welcome mode, the display apparatus 100 may operate in a TV-on mode. While the display apparatus 100 is in a sleep mode, when a third signal is received, the apparatus can be swift to a TV-on mode, not stand-by mode and welcome mode.

Here, the display apparatus 100 may activate only a function related to content reproduction based on information on content executed in an external during an operation in the welcome mode and, in this regard, integrated services in which the display apparatus 100 operates in a welcome mode to reproduce content will be defined as a welcome mode service.

That is, in terms of a user, when the user uses the user terminal apparatus 200 outdoors, enters a house and, then, points toward a screen of the display apparatus 100 using a remote controller or moves the user terminal apparatus 200, the user may feel as if a service of continuously reproducing content that is automatically executed by the user terminal apparatus 200 is provided like the display apparatus 100 welcomes the user, and this service will be defined as a welcome mode service.

As seen from FIG. 5, a welcome mode assistant app is being executed on a screen of the user terminal apparatus 200. A procedure of providing and setting the application from the display apparatus 100 will be described below.

Figure 6:
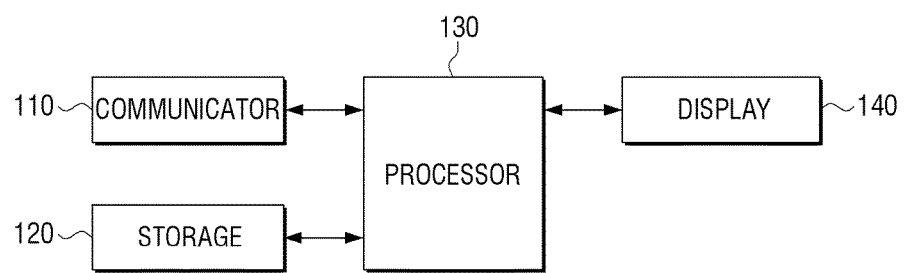
FIG. 6 is a block diagram illustrating an alternative structure of the display apparatus according to an exemplary embodiment.

FIG. 6 is a block diagram illustrating another structure of the display apparatus 100 according to an exemplary embodiment of the present disclosure.

Referring to FIG. 6, the display apparatus 100 may include the communicator 110, the storage 120, the processor 130, and a display 140.

Here, the communicator 110, the storage 120, and the processor 130 have been described already and, thus, a detailed description thereof will be omitted.

The display 140 may display a broadcast program or various contents and may be embodied as a liquid crystal display (LCD), an organic light emitting display (OLED), a plasma display panel (PDP), or the like.

The processor 130 may provide a menu for selecting whether a welcome mode of the display apparatus 100 is provided, through the display 140 and, when the welcome mode is set to be provided through the menu, the processor 130 may provide a preset application that is executed by an external device and used to control the welcome mode in the external device.

Here, the preset application may be an application for performing a function of synchronizing the display apparatus 100 and an external device with each other and may perform a function of controlling transmission of the first signal to the display apparatus 100, transmission of content to the display apparatus 100, transmission of the second signal for allowing the display apparatus 100 to operate in a welcome mode, and transmission of the third signal for allowing the display apparatus 100 to operate in a TV-on mode when the external device accesses the AP 300, as described above.

Throughout this specification, a name of the preset application will be defined as welcome mode assistant app for providing a welcome mode service to a user.

Figure 7:
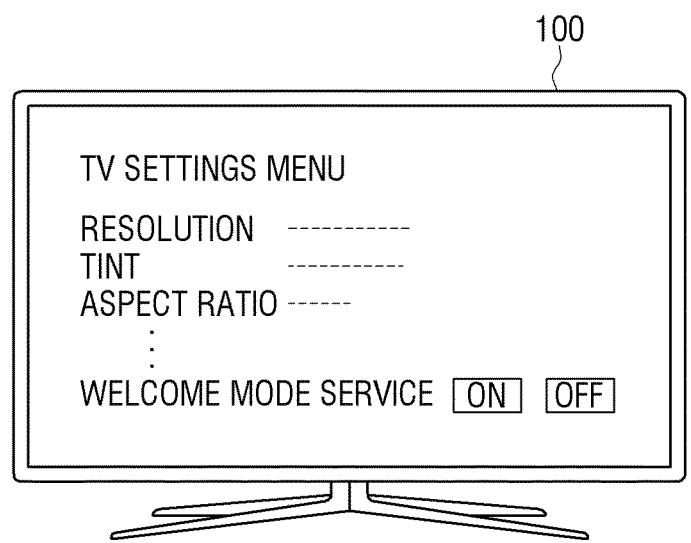
FIG. 7 is a diagram illustrating a procedure of selecting an operation in an welcome mode according to an exemplary embodiment.

FIG. 7 is a diagram for explanation of a procedure of selecting whether an operation is performed in a welcome mode according to an exemplary embodiment of the present disclosure.

Referring to FIG. 7, the processor 130 may display an environment setting menu of the display apparatus 100 through the display 140 and the environment setting menu may include an item such as resolution, color impression, and aspect ratio and an item for selecting whether a welcome mode service is activated.

Here, when a user activates the welcome mode service, this means that the display apparatus 100 is capable of operating in an IOT-on mode, which has been already described above.

When the user selects to activate the welcome mode service on the environment setting menu of the display apparatus 100, the processor 130 may provide a service of downloading the welcome mode assistant app executable by an external device.

For example, the processor 130 may provide a QR code for downloading the welcome mode assistant app and transmit a link address of downloading the welcome mode assistant app to an external device.

Accordingly, the external device may download, install, and execute the welcome mode assistant app and display a list of connectable APs during execution of the welcome mode assistant app.

The external device may guide the user to select an AP to which the display apparatus 100 is connected by highlighting the AP to which the display apparatus 100 is connected or displaying the AP together with a preset icon from the list of the connectable APs.

When the user selects the AP to which the display apparatus 100 is connected, if the external device accesses the corresponding AP, the first signal may be transmitted to the display apparatus 100, and the display apparatus 100 may display an image for asking whether content information stored in the external device is to be transmitted and, then, display a form (e.g., an entire image form or a thumbnail form) for displaying content by the display apparatus 100 and display an image for selecting a preset image feedback.

Accordingly, the welcome mode assistant app that is installed and executed in the external device may store information on an AP to which the external device is automatically connected, control information for transmitting the first signal and content information stored in the external device to the display apparatus 100 through the corresponding AP, and information on a method of reproducing content by the display apparatus 100 and an effect provided together.

The welcome mode assistant app that is installed and executed in the external device may provide an image for turning on the display apparatus 100 upon receiving a response signal to the first signal from the display apparatus 100, as illustrated in FIG. 5, and when a user selects the TV turn-on displayed on the provided image, the welcome mode assistant app may perform control to transmit the third signal to the display apparatus 100 through an IR transmitting module or a communication module included in the external device.

When the user selects to deactivate the welcome mode in the environment setting menu of the display apparatus 100, even if the user terminal apparatus 200 accesses an AP and transmits the first signal to the display apparatus 100, the processor 130 may disregard the received first signal, and even if processor 130 receives the second signal, the processor 130 may not operate in a welcome mode.

Figure 8:
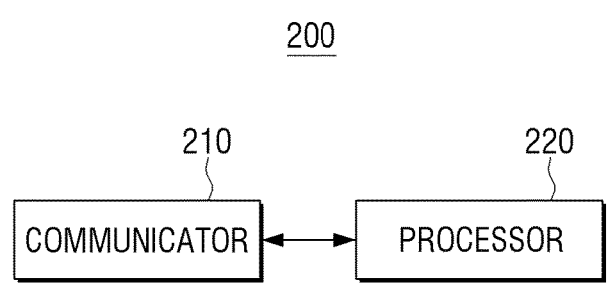
FIG. 8 is a block diagram illustrating a structure of a user terminal apparatus according to an exemplary embodiment.

FIG. 8 is a block diagram illustrating a structure of the user terminal apparatus 200 according to an exemplary embodiment of the present disclosure.

The user terminal apparatus 200 may be used to control the display apparatus 100 that operates in a sleep-mode and, referring to FIG. 8, the user terminal apparatus 200 may include a communicator 210 and a processor 220.

The user terminal apparatus 200 may be embodied as a smartphone, a tablet PC, a portable terminal apparatus, a smart watch, and a wearable device.

The communicator 210 may communicate with an AP to which the display apparatus 100 is connected. In detail, the communicator 210 may communicate with an AP using various communication schemes such as Bluetooth (BT), wireless fidelity (Wi-Fi), Zigbee, infrared (IR), serial interface, universal serial bus (USB), and near field communication (NFC).

When preset content is executed or updated, the processor 220 may transmit a wake-up signal to the display apparatus 100 through the AP and, upon receiving a response signal to the wake-up signal from the display apparatus 100, the processor 220 may control the communicator 210 to transmit information on content to the display apparatus 100. Here, the wake-up signal may correspond to the aforementioned first signal.

In detail, the processor 220 may determine whether preset content is executed or preset content is updated prior to access to the AP and determine whether the wake-up signal is transmitted to the display apparatus 100 through the AP.

For example, when preset content is a video image, the processor 220 may determine that a video image is reproduced based on history information on whether the video image is reproduced prior to access to the AP and, accordingly, when the user terminal apparatus 200 accesses the AP to which the display apparatus 100 is connected, the processor 220 may automatically transmit the wake-up signal to the display apparatus 100.

When the preset content is an image, the processor 220 may determine whether the image is updated based on whether the number of image files increases prior to access to the AP or whether an uploader program for uploading the newly generated image files is executed and, accordingly, when the user terminal apparatus 200 accesses the AP to which the display apparatus 100 is connected, the processor 220 may automatically transmit the wake-up signal to the display apparatus 100.

The processor 220 may transmit information on preset content to the display apparatus 100.

Accordingly, the display apparatus 100 that receives the wake-up signal may receive information on content stored in the user terminal apparatus 200 and store the information in the storage 120 while operating in the stand-by mode.

Then, upon receiving the second signal from the user terminal apparatus 200 or a remote controller device, the display apparatus 100 may operate in a welcome mode to reproduce content based on information on the stored content.

However, when preset content is not executed or preset content is not updated prior to access to the AP, even if the display apparatus 100 accesses the AP to which the user terminal apparatus 200 is connected, the processor 220 may not transmit the wake-up signal to the display apparatus 100.

Accordingly, the display apparatus 100 that does not receive the wake-up signal may not operate in the standby mode and receive information on content.

Even if the display apparatus 100 does not receive the second signal from the user terminal apparatus 200 or the remote controller device, the display apparatus 100 may not operate in the welcome mode and may maintain a screen to be turned off.

Accordingly, the user terminal apparatus 200 and the display apparatus 100 may be automatically synchronized with each other and may transmit and receive information only when preset content is executed or updated and, thus, the display apparatus 100 may provide a welcome mode service of continuously providing content executed by the user terminal apparatus 200.

The preset content may include content that is preset by a preset application according to user manipulation. Here, the preset application may correspond to the welcome mode assistant app and, similarly, the user terminal apparatus 200 may correspond to the aforementioned external device. Accordingly, procedures of installing and setting the aforementioned welcome mode assistant app may be applied to the user terminal apparatus 200 in the same way.

Figure 9:
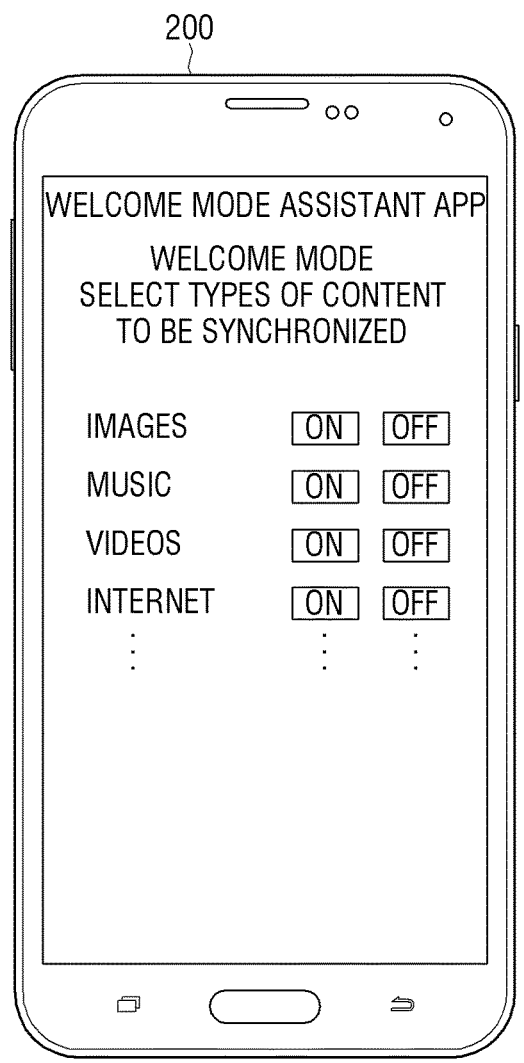
FIG. 9 is a diagram illustrating a procedure of configuring content according to an exemplary embodiment.

FIG. 9 is a diagram for explanation of a procedure of setting preset content according to an exemplary embodiment of the present disclosure.

As seen from FIG. 9, an image of selecting a function for synchronization with the display apparatus 100 in a welcome mode service by the welcome mode assistant app executed by the user terminal apparatus 200 is displayed.

For example, a function for synchronization with the display apparatus 100 in the welcome mode service by the welcome mode assistant app may include whether an image, music, a video image, the Internet, and so on are reproduced and, needless to say, various functions executable by the user terminal apparatus 200 may be selected according to user manipulation.

When a preset event occurs, the processor 220 may transmit a second signal for reproducing content based on information on the received content by the display apparatus 100, to the display apparatus 100.

The preset event may include the case in which user manipulation is input to the user terminal apparatus 200 or the case in which a user moves the user terminal apparatus 200 so as to allow the user terminal apparatus 200 to perform preset movement.

Accordingly, the display apparatus 100 may operate in a welcome mode for activating only a function related to content reproduction based on content information stored in the storage 120 based on the received second signal.

The processor 220 may transmit a TV-on signal for reproducing a broadcast program by the display apparatus 100 according to user manipulation, to the display apparatus 100.

Here, the TV-on signal may correspond to the aforementioned third signal.

As illustrated in FIG. 5, the TV-on signal may be generated by touching a TV turn-on icon displayed on the welcome mode assistant app executed by the user terminal apparatus 200 according to user manipulation and transmitted to the display apparatus 100 or may be generated by a remote controller device and transmitted to the display apparatus 100 by pushing a TV-on functional key included in the remote controller device according to user manipulation.

Accordingly, the display apparatus 100 may activate all components of the display apparatus 100 based on the received TV-on signal, for example, activate all components such as a tuner, an image processor, a sound processor, a scaler, and a sensor included in the display apparatus 100, and receive and display a broadcast program.

Figure 10:
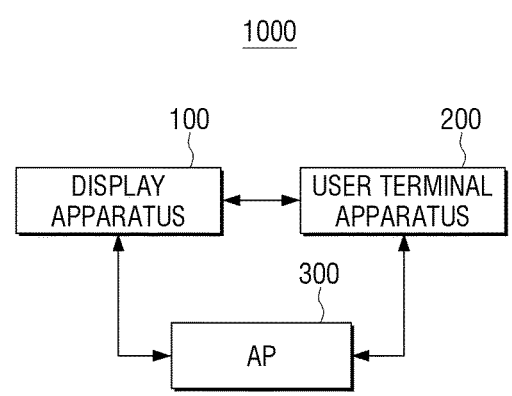
FIG. 10 is a block diagram illustrating a structure of a system including a display apparatus operating in a sleep mode and a user terminal apparatus for controlling the display apparatus according to an exemplary embodiment.

FIG. 10 is a block diagram illustrating a structure of a system 1000 including the display apparatus 100 operating in a sleep-mode and the user terminal apparatus 200 for controlling the display apparatus 100 according to an exemplary embodiment of the present disclosure.

Referring to FIG. 10, the system 1000 may include the display apparatus 100, the user terminal apparatus 200, and the AP 300.

Here, the user terminal apparatus 200 may access the AP 300 to which the display apparatus 100 is connected, may transmit a wake-up signal to the display apparatus 100 through the AP 300 when preset content is executed or updated, may transmit information on content to the display apparatus 100 upon receiving a response signal corresponding to the wake-up signal from the display apparatus 100, and may transmit a second signal to the display apparatus 100 when a preset even occurs.

The display apparatus 100, when a wake-up signal is received in a sleep-mode, by switching from a sleep mode to a standby mode, may transmit a response signal to the wake-up signal to the user terminal apparatus 200, and stores a content received from the user terminal apparatus 200.

The display apparatus 100, when a second signal is additionally received from the user terminal apparatus 200, may activate the image processor which processes a content and a display to display the processed content.

Figure 11:
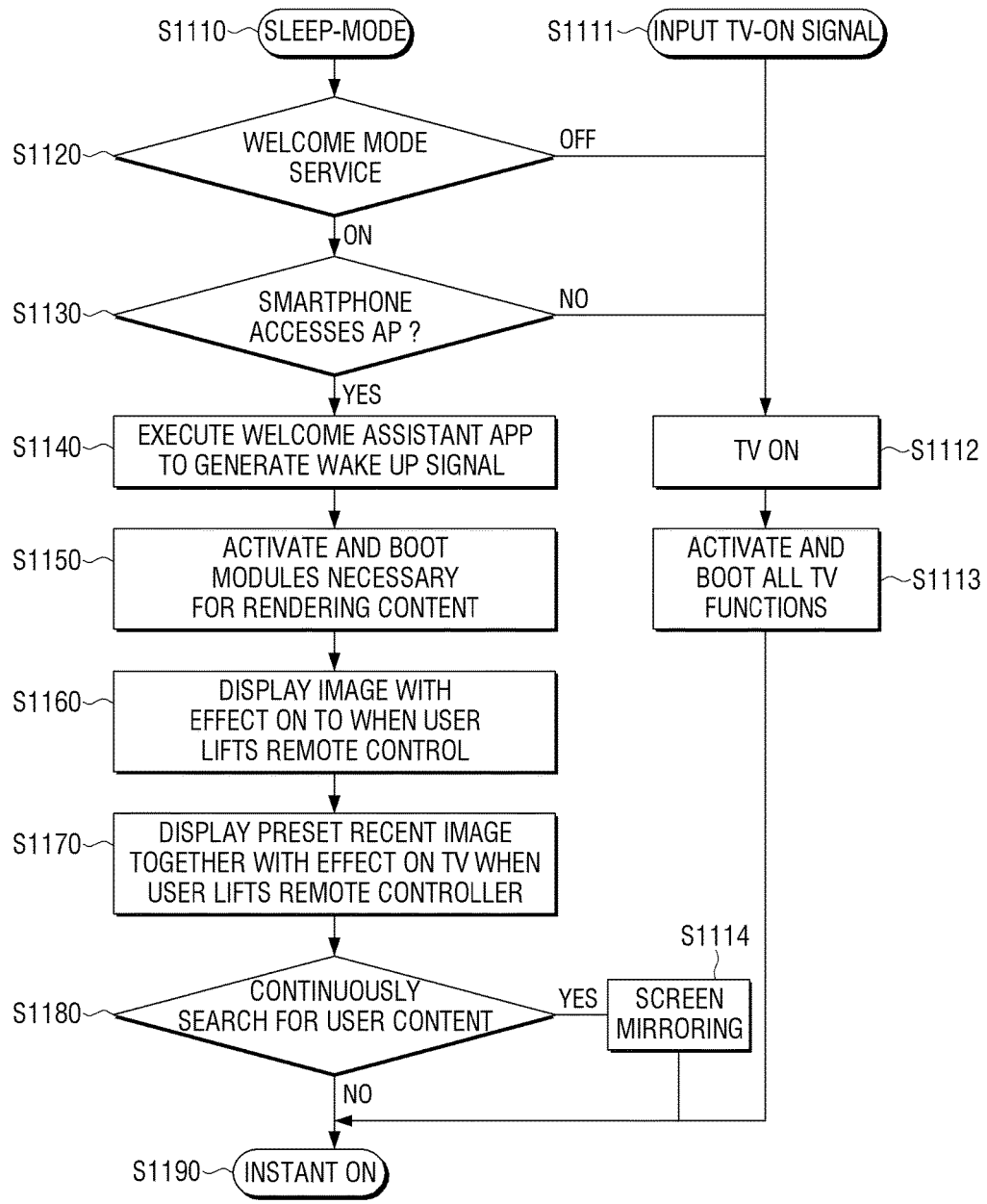
FIG. 11 is a flowchart for an operating procedure of a system according to an exemplary embodiment.

FIG. 11 is a flowchart for explanation of an overall operating procedure of a system according to an exemplary embodiment of the present disclosure.

Referring to FIG. 11, when the display apparatus 100 is in a sleep-mode (S1110), when the welcome mode is activated according to whether a welcome mode service is activated (S1120), if a smartphone (the user terminal apparatus 200)

accesses the AP 300 (S1130), the smartphone may execute the welcome mode assistant app to generate a wake-up signal and transmit the generated wake-up signal to the display apparatus 100 (S1140).

The display apparatus 100 that receives the wake-up signal may activate and boot only minimum blocks for reproducing content (S1150).

The smartphone may transmit information on content (e.g., an image) executed and updated through the welcome mode assistant app to the display apparatus 100 and the display apparatus 100 may store the information in the activated storage 120 (S1160).

Then, when a user lifts a remote controller device or moves a smartphone, if the remote controller device or the smartphone transmits a second signal to the display apparatus 100, the display apparatus 100 may provide preset image feedback together while displaying content based on information on the stored content (S1170).

When the smart phone continuously searches for content used by a user (S1180) and the used content is present, a screen mirroring function may be performed to reproduce the content through the display apparatus 100 (S1114) and, when the used content is not present, the display apparatus 100 may operate in an INSTANT ON state (S1190). Here, the INSTANT ON state may refer to a state in which all components of the display apparatus 100 are activated and operated.

When the display apparatus 100 selects to deactivate the welcome mode service or a smartphone does not access an AP, a TV-on signal may be transmitted to the display apparatus 100 according to user manipulation with respect to a smartphone or a remote controller device, and when the TV-on signal is transmitted to the display apparatus 100 (S1111), the display apparatus 100 may become in a TV-on state (S1112) and all components of the display apparatus 100 may be activated and may boot (S1113).

Figure 12:
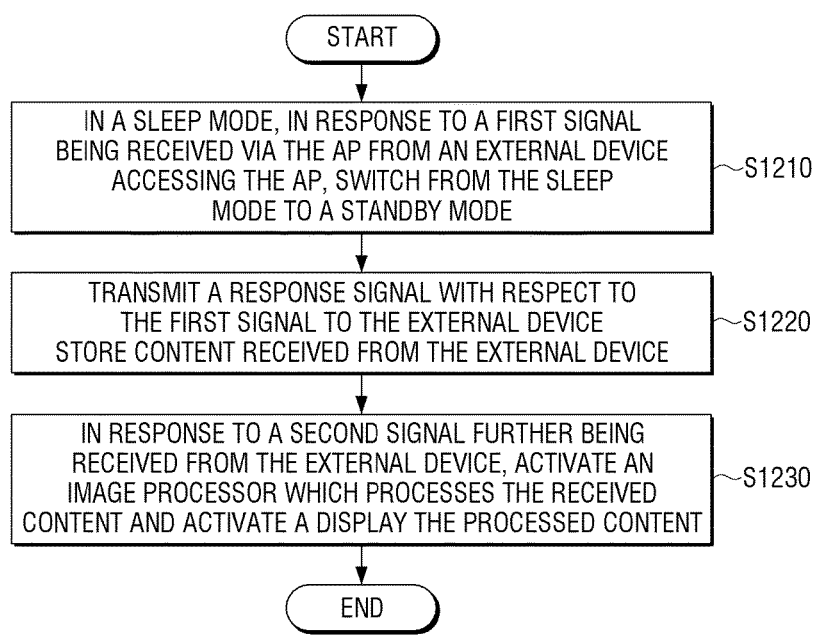
FIG. 12 is a flowchart for a method of controlling a display apparatus according to an exemplary embodiment.

FIG. 12 is a flowchart for explanation of a method of controlling a display apparatus according to an exemplary embodiment of the present disclosure.

In the method of controlling the display apparatus illustrated in FIG. 12, as an external device accesses an AP in a sleep mode, when a first signal is received from the AP, by switching the sleep mode to the standby mode, s response signal with respect to the received first signal is transmitted to an external device (S1210).

Content stored in the external device may be received and stored (S1220).

When the second signal is received from the external device, the image processor which processes the received content and a display which displays a processed content are activated (S1230).

Here, the activating may include, when a second signal is received, providing a preset screen feedback indicating in a welcome mode to activate the image processor and the display and reproducing the aforementioned content.

The content may include content executed by the external device until the external device accesses the AP.

The method of controlling the display apparatus according to an exemplary embodiment of the present disclosure may further include operating in a TV-on mode for reproducing a broadcast program by activating a tuner upon receiving the third signal from the external device.

The method of controlling the display apparatus according to an exemplary embodiment of the present disclosure may further include providing a menu for selecting whether a welcome mode of the display apparatus is provided and providing a preset application executable by the external device and used to control the welcome mode by the external device when the welcome mode is set to be provided through the menu.

Figure 13:
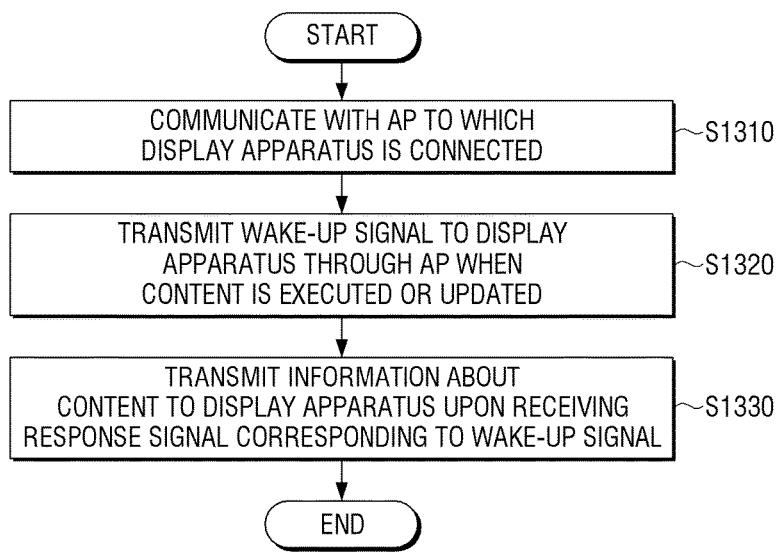
FIG. 13 is a flowchart for a method of a user terminal apparatus controlling a display apparatus operating in a sleep mode according to an exemplary embodiment.

FIG. 13 is a flowchart for explanation of a method of controlling a user terminal apparatus for controlling a display apparatus operating in a sleep-mode according to an exemplary embodiment of the present disclosure.

In the method of controlling the user terminal apparatus illustrated in FIG. 13, the display apparatus may communicate with an AP to which the display apparatus is connected (S1310).

When preset content is executed or updated, a wake-up signal may be transmitted to the display apparatus through the AP (S1320).

Then, upon receiving a response signal corresponding to the wake-up signal, the user terminal apparatus may perform control to transmit content to the display apparatus (S1330).

Here, the preset content may include content that is preset by a preset application according to user manipulation.

The method of controlling the user terminal apparatus according to an exemplary embodiment of the present disclosure may further include transmitting the second signal for reproducing content by activating the display by the display apparatus to the display apparatus when a preset event occurs.

The method of controlling the user terminal apparatus according to an exemplary embodiment of the present disclosure may further include transmitting the third signal for reproducing a broadcast program by activating the tuner by the display apparatus to the display apparatus according to user manipulation.

A non-transitory computer readable medium for recording thereon a program for sequentially performing the controlling method according to the embodiments of the present disclosure may be provided.

The non-transitory readable medium is a medium that semi-permanently stores data and from which data is readable by a device, but not a medium that stores data for a short time, such as register, a cache, a memory, and the like. In detail, the aforementioned various applications or programs may be stored in the non-transitory readable medium, for example, a compact disc (CD), a digital versatile disc (DVD), a hard disc, a bluray disc, a universal serial bus (USB), a memory card, a read only memory (ROM), and the like.

Although the above block diagrams illustrating the electronic apparatus do not illustrate a bus, components of the electronic apparatus may communicate with each other via the bus. In addition, each apparatus may further include a processor such as a center processing unit (CPU), a micro processor, and so on, for performing the aforementioned operations.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A display apparatus, comprising:
a communicator;
a storage;
a display;
an image processor; and
a processor configured to:

in response to a first signal being received from an external device while the display apparatus operates in a sleep mode, switch from the sleep mode to a standby mode and transmit a response signal with respect to the first signal to the external device, the response signal including a content request signal, receive content information regarding a content that is stored in the external device and satisfies a time condition determined by the external device, and store the content information received from the external device in the storage while the display apparatus operates in the standby mode in which the display is turned off, wherein the processor is further configured to, in response to a second signal further being received from the external device or a remote controller of the display apparatus while the display apparatus operates in the standby mode, activate the display to display a content image based on the content information stored in the storage.

2. The display apparatus as claimed in claim 1, wherein the processor is further configured to reproduce the processed content while providing preset image feedback indicating operating in a welcome mode which activates the image processor and the display upon receiving the second signal.

3. The display apparatus as claimed in claim 1, wherein the processed content comprises content executed by the external device until the external device accesses an access point (AP).

4. The display apparatus as claimed in claim 1, further comprising:

a tuner configured to receive a broadcast program, wherein the processor is further configured to operate in a TV-on mode for reproducing the broadcast program by activating the tuner upon receiving a third signal from the external device.

5. The display apparatus as claimed in claim 1, wherein the processor is further configured to provide a menu for selecting whether a welcome mode of the display apparatus is provided through the display and provide a preset application executable by the external device and configured to control the welcome mode by the external device when the welcome mode is set to be provided through the menu.

6. The display apparatus of claim 1, wherein the display is in an off state in the sleep mode and the standby mode, and wherein the processor consumes more power in the sleep mode than the processor does in the standby mode.

7. A user terminal apparatus for controlling a display apparatus operating in a sleep-mode, comprising:

a communicator configured to communicate with the display apparatus; and a processor configured to:

while the display apparatus operates in a sleep mode, transmit a first signal, for switching the display apparatus from the sleep mode to a standby mode, to the display apparatus when preset content is executed or updated, and perform control to transmit content information regarding the preset content, apparatus upon receiving a response signal corresponding to the first signal from the display apparatus, the response signal including a content request signal, wherein the response signal is for the display apparatus to receive the content information stored in the user terminal apparatus.

8. The user terminal apparatus as claimed in claim 7, wherein the preset content comprises content preset by a preset application according to user manipulation.

9. The user terminal apparatus as claimed in claim 7, wherein the processor is further configured to transmit a second signal for reproducing the preset content to the display apparatus by activating a display by the display apparatus when a preset event occurs.

10. The user terminal apparatus as claimed in claim 7, wherein the processor is further configured to transmit a third signal for reproducing a broadcast program by activating a tuner by the display apparatus to the display apparatus according to user manipulation.

11. A system comprising:

a display apparatus operating in a sleep mode; and a user terminal apparatus for controlling the display apparatus;

wherein the user terminal apparatus is configured to:

transmit a first signal to the display apparatus when preset content is executed or updated, transmit content information regarding the preset content, which satisfies a time condition determined by the user terminal apparatus, to the display apparatus upon receiving a response signal corresponding to the first signal from the display apparatus, the response signal including a content request signal, and transmit a second signal to the display apparatus when a preset event occurs; and wherein the display apparatus is configured to:

in response to the first signal being received while the display apparatus operates in the sleep mode, switch from the sleep mode to a standby mode, transmit the response signal with respect to the first signal to the user terminal apparatus to receive the content information regarding the preset content stored in the user terminal apparatus, and store the content information received from the user terminal apparatus while the display apparatus operates in the standby mode in which a display of the display apparatus is turned off, in response to the second signal further being received from the user terminal apparatus while the display apparatus operates in the standby mode, activate an image processor which processes a received content and a display which displays a content image based on the content information on the preset content stored in the display apparatus, upon receiving the second signal.

12. A method of controlling a display apparatus, the method comprising:

in response to a first signal being received from an external device while the display apparatus operates in a sleep mode, switching from the sleep mode to a standby mode;

transmitting a response signal with respect to the first signal to the external device, the response signal including a content request signal, receiving content information regarding a content that is stored in the external device and satisfies a time condition determined by the external device;

storing the content information received from the external device while the display apparatus operates in the standby mode in which a display of the display apparatus is turned off; and in response to a second signal further being received from the external device or a remote controller of the display apparatus while the display apparatus operates in the standby mode, activating a display to display a content image based on the content information regarding the content stored in the display apparatus.

13. The method as claimed in claim 12, wherein the activating comprises reproducing the processed content while providing preset image feedback indicating in a welcome mode which activates an image processor and the display upon receiving the second signal.

14. The method as claimed in claim 12, wherein the processed content comprises content executed by the external device until the external device accesses an access point (AP).

15. The method as claimed in claim 12, further comprising operating in a TV-on mode for reproducing a broadcast program by activating a tuner upon receiving a third signal from the external device.

16. The method as claimed in claim 12, further comprising:
   providing a menu for selecting whether a welcome mode of the display apparatus is provided; and
   providing a preset application executable by the external device and configured to control the welcome mode by the external device when the welcome mode is set to be provided through the menu.

17. A method of controlling a user terminal apparatus for controlling a display apparatus operating in a sleep mode, the method comprising:
   communicating with the display apparatus;
   while the display apparatus operates in the sleep mode, transmitting a first signal, for switching the display apparatus from the sleep mode to a standby mode, to the display apparatus when preset content is executed or updated; and
   performing control to transmit content information regarding the preset content, which satisfies a time condition determined by the user terminal apparatus, to the display apparatus upon receiving a response signal corresponding to the first signal from the display apparatus, the response signal including a content request signal,
   wherein the response signal is for the display apparatus to receive the content information stored in the user terminal apparatus.

18. The method as claimed in claim 17, wherein the preset content comprises content preset by a preset application according to user manipulation.

19. The method as claimed in claim 17, further comprising transmitting a second signal for reproducing the preset content to the display apparatus by activating a display by the display apparatus when a preset event occurs.

20. The method as claimed in claim 17, further comprising transmitting a third signal for reproducing a broadcast program by activating a tuner by the display apparatus to the display apparatus according to user manipulation.

* * * * *